H. M. PFLAGER.
BOOSTER MOTOR TRAILER TRUCK.
APPLICATION FILED SEPT. 10, 1919.
1,381,496. Patented June 14, 1921.
2 SHEETS—SHEET 1.
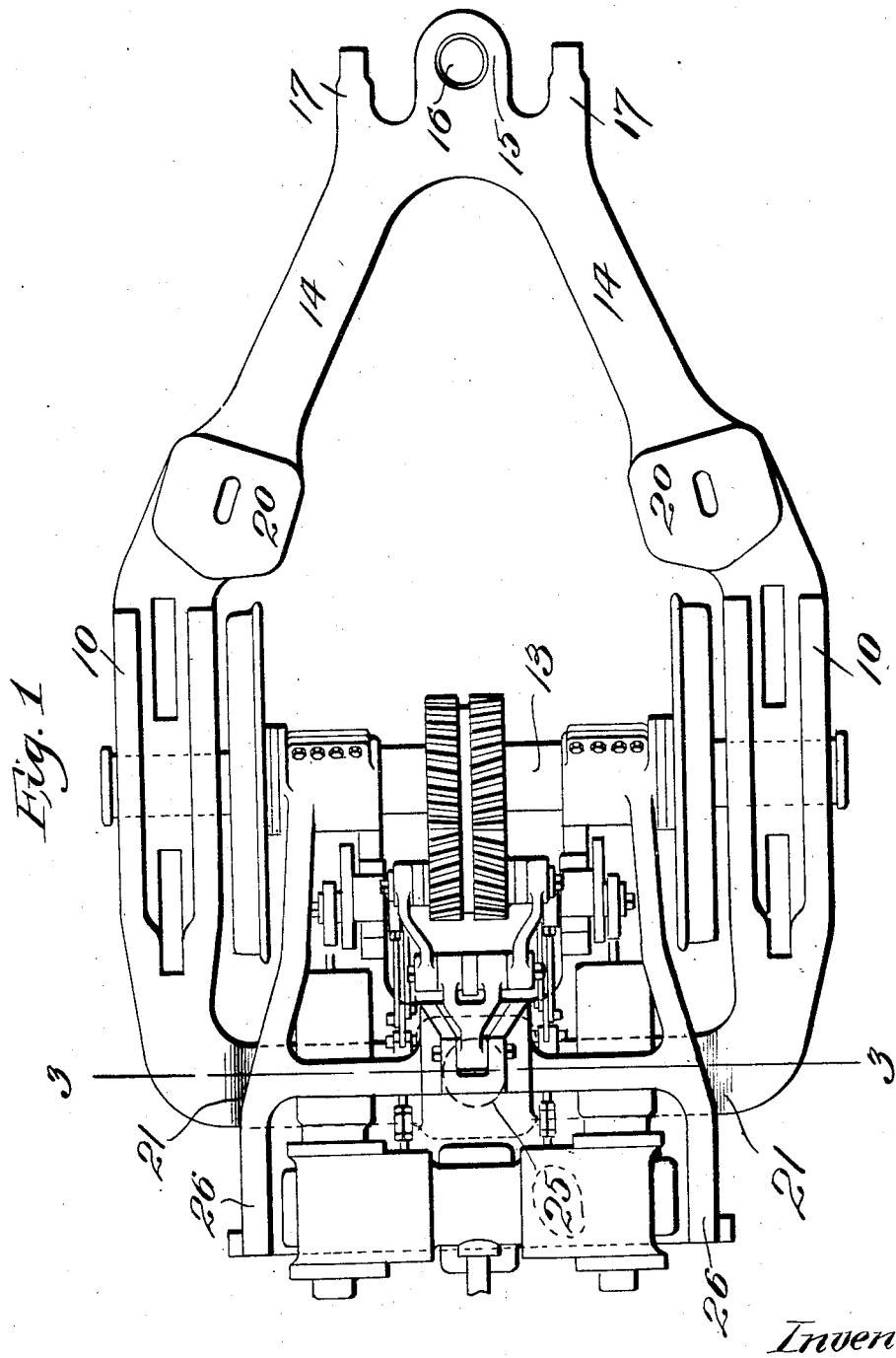
Inventor
Harry M. Pflager H. M. PFLAGER.
BOOSTER MOTOR TRAILER TRUCK.
APPLICATION FILED SEPT. 10, 1919.
1,381,496.
Patented June 14, 1921.
2 SHEETS—SHEET 2.
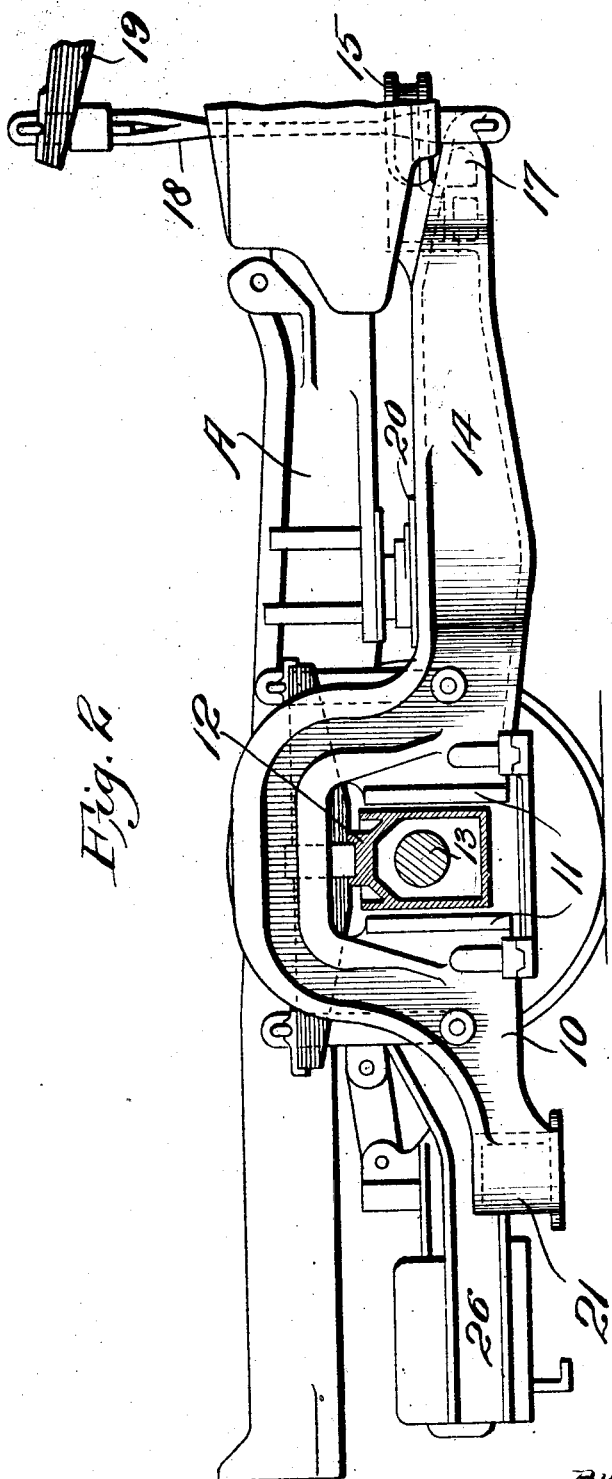
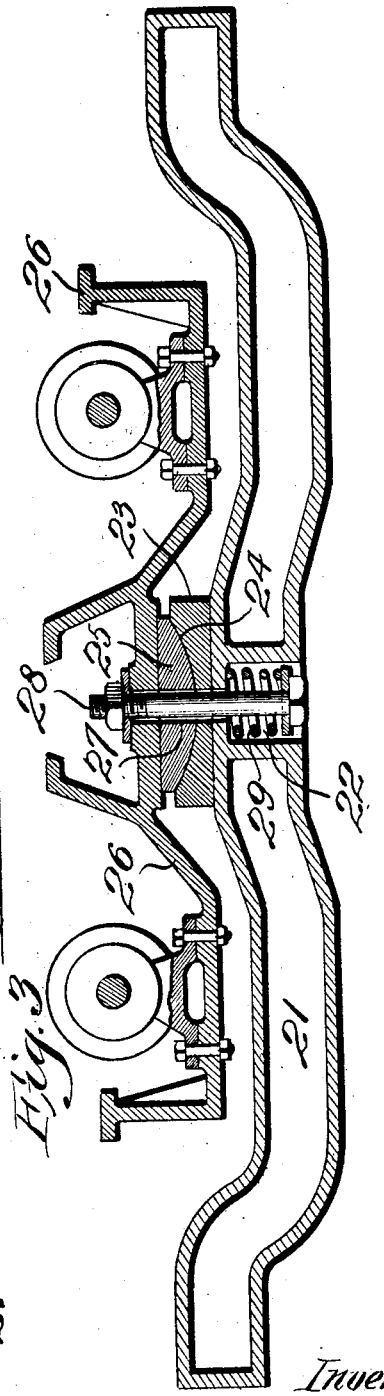
Inventor
Harry M. Pflager

UNITED STATES PATENT OFFICE.

HARRY M. PFLAGER, OF ST. LOUIS, MISSOURI.

BOOSTER-MOTOR TRAILER-TRUCK.

1,381,496.   Specification of Letters Patent.   Patented June 14, 1921.

Application filed September 10, 1919. Serial No. 322,861.

*To all whom it may concern:*

Be it known that I, HARRY M. PFLAGER, a citizen of the United States, residing at St. Louis, Missouri, have invented a certain new and useful Improvement in Booster-Motor Trailer-Trucks, of which the following is a full, clear, and exact description, such as will enable others skilled in the art to which it appertains to make and use the same, reference being had to the accompanying drawings, forming part of this specification.

My invention relates generally to trailer trucks for locomotives, and more specifically to the frame of a trailer truck that is designed to receive the type of booster motor for locomotives that is disclosed in the patent to Howard L. Ingersoll, No. 1,339,395, dated May 11, 1920.

My copending application, filed August 6, 1919, Serial No. 315,612, (patented November 2, 1920, No. 1,357,928) relates to a novel mounting for the type of booster motor disclosed in the aforesaid Ingersoll patent and the particular form of trailer truck frame that constitutes the mounting disclosed in my patent aforesaid, forms the subject-matter of this application.

The principal objects of my present invention are, to provide a relatively simple, strong and efficient trailer truck frame that will readily receive and retain in a firm and substantial manner, the supporting frame or bed plate of the booster motor and its associated parts.

Further objects of my invention are, to construct the trailer truck frame in a single piece, preferably by casting, thereby materially increasing the strength and rigidity of the complete structure and eliminating the time, labor and expense ordinarily involved in the production and assembly of a built-up structure, and, further, to form integral with the truck frame, certain essential bearings, lugs, brackets, and the like.

With the foregoing and other objects in view, my invention consists in certain novel features of construction and arrangement of parts, hereinafter more fully described, and claimed, and illustrated in the accompanying drawings, in which—

Figure 1 is a plan view of a booster motor trailer truck of my improved construction.

Fig. 2 is a side elevational view of the truck.

Fig. 3 is an enlarged cross section taken approximately on the line 3—3 of Fig. 1.

Referring in detail to the accompanying drawings, which illustrate a practical embodiment of my invention, it will be noted that the trailer truck frame is formed in a single piece and while such construction is preferable, it will be readily understood that the frame may be made up of separately formed parts secured to each other in any suitable and well-known manner.

The rear portions 10, 10 of the side members of the truck frame are arranged parallel with each other and said portions are arched to form pedestal jaws 11, between which are arranged the usual boxes 12 that receive the journals of the trailer truck axle 13. Extending forwardly from the arched rear portions 10 are the forward portions 14 of the side members of the truck frame, said forward portions converging and uniting with each other at a point on the medial line of the truck.

Extending forwardly from the connected forward ends of the forward portions 14 is a bracket 15 provided with a vertically disposed aperture 16 which serves as a bearing for the king pin that pivotally connects the trailer truck to a part of the main frame of the locomotive.

Formed integral with or fixed to the forward portions of the members 14 and disposed to the sides of the bracket 15 are forwardly projecting lugs or brackets 17 which serve as points of connection for the lower ends of hangers 18, the upper ends of which are suitably suspended from the rear ends of the rear driver springs 19, the latter constituting a part of the main equalizing system of the locomotive.

Arranged at suitable points on the forward parts 14 of the side members of the truck frame are pads or plates 20 which serve as bearings for parts of the main locomotive frame A. The rear ends of the arched rear portions 10 of the trailer truck frame are connected by a transversely disposed rail or beam 21, the same being either hollow or flanged for the purposes of strength and rigidity and the greater portion of said rail or beam is depressed so that it occupies a plane slightly below the plane occupied by the rear ends of the portions 10, such construction being employed in order to accommodate the bed plate or supporting frame for the booster motor.

Formed in the underside of the rail or beam 21 and at a central point thereupon is a pocket 22, the bottom of which is open and positioned on top of the central portion of this beam immediately over said pocket is a bearing plate 23. The top of this bearing plate is concave as designated by 24 in order to receive the under convex bearing face of a plate or pad 25, which latter serves as a support for the bed plate or frame 26 of the booster motor.

Formed through the top of beam 21 above the pocket 22 and through the bearing plates 23 and 25 and through bed plate 26 are alined apertures 27 through which pass a bolt or king pin 28. The alined apertures 27 are slightly larger in diameter than this king pin or bolt, thereby permitting a certain degree of universal rocking or tilting movement of the trailer truck frame and the booster motor bed plate relative to each other.

The lower portion of the bolt 28 extends downwardly into the pocket 22 and interposed between the head of said bolt or a washer positioned on said bolt adjacent to said head and the top plate of the beam is a compression spring 29. The upper threaded end of the bolt 28 receives a nut and washer, the latter bearing directly on top of a part of the booster motor bed plate 26.

By virtue of the construction just described, the booster motor frame or bed plate 26 and the trailer truck frame are free to rock relative to each other for a limited distance in all directions and under certain conditions, said frame and bed plate may move away from each other vertically for a certain distance but this latter movement is resisted and limited by the spring 29.

For a detailed description of the particular form of booster motor bed plate that is carried by my improved truck frame, reference may be had to my hereinbefore mentioned Patent No. 1,357,928.

Thus it will be seen that I have provided a relatively simple and efficient frame for trailer trucks, said frame being designed and constructed so as to form a firm and substantial support for the bed plate of the booster motor associated with said truck. Further, by forming the truck frame in a single piece, the manufacturing cost thereof is minimized and the finished structure, while relatively light in weight, has great strength and rigidity, and is very effective in performing its intended functions.

It will be readily understood that minor changes in the size, form and construction of the various parts of my improved booster motor trailer truck may be made and substituted for those herein shown and described, without departing from the spirit of my invention, the scope of which is set forth in the appended claims.

I claim:

1. A radially movable trailer truck frame for locomotives, and a bearing on said truck frame for a booster motor support.

2. In a radial trailer truck for locomotives, a truck frame adapted to be connected to the frame of a locomotive adjacent to the drivers thereof, said frame being cast in a single piece, and a bearing on said frame, which bearing is adapted to support a booster motor bed plate.

3. In a radial trailer truck for locomotives, a frame having a transversely disposed member, and a booster motor bed plate bearing on said member.

4. In a radial trailer truck for locomotives, a frame having a transversely disposed member that occupies a plane below the plane occupied by the adjacent parts of the frame, and a booster motor bed plate bearing on said member.

5. A radial trailer truck frame for locomotives cast in a single piece, and a booster motor bed plate bearing on said truck frame near one end thereof.

6. A radial trailer truck frame for locomotives cast in a single piece and having arched portions to form journal box openings, and a booster motor bed plate bearing on said truck frame near one end thereof.

7. A radial trailer truck frame for locomotive cast in a single piece and provided with integrally formed pairs of pedestal jaws, and a booster motor bed plate bearing on said truck frame near one end thereof.

8. A radial trailer truck frame for locomotives cast in a single piece and having a depressed portion, and a booster motor bed plate bearing on said depressed portion.

9. A radial trailer truck frame for locomotives cast in a single piece and having a transversely disposed rear rail, and a booster motor bed plate bearing on said rear rail.

10. A radial trailer truck frame for locomotives cast in a single piece, and a transversely disposed member forming a part of said truck frame, a portion of which member is depressed for the accommodation of a booster motor bed plate.

In testimony whereof I hereunto affix my signature this 4th day of September, 1919.

HARRY M. PFLAGER.